United States Patent [19] [11] Patent Number: 6,123,250
De Klein et al. [45] Date of Patent: Sep. 26, 2000

[54] REFLOW OVEN

[75] Inventors: Franciscus Johannes De Klein, Odijk; Rolf Arthur Den Dopper, Roosendaal, both of Netherlands

[73] Assignee: Soltec B.V., Oosterhout, Netherlands

[21] Appl. No.: 09/313,230

[22] Filed: May 17, 1999

[30] Foreign Application Priority Data

May 19, 1998 [NL] Netherlands .......................... 1009214

[51] Int. Cl.$^7$ ........................... B23K 31/02; B23K 35/38
[52] U.S. Cl. ........................ 228/180.1; 228/187; 228/219
[58] Field of Search ................................ 228/180.1, 187, 228/219

[56] References Cited

U.S. PATENT DOCUMENTS

| 3,840,169 | 10/1974 | Steranko et al. ............................. 228/4 |
| 3,905,038 | 9/1975 | Beyerlein .................................. 357/70 |
| 4,017,963 | 4/1977 | Beyerlein .................................. 29/577 |
| 4,600,137 | 7/1986 | Comerford .............................. 228/102 |
| 4,775,085 | 10/1988 | Spigarelli et al. ...................... 219/382 |
| 4,874,124 | 10/1989 | Johns et al. ........................... 228/180.1 |
| 5,069,380 | 12/1991 | Deambrosio .............................. 228/42 |
| 5,076,487 | 12/1991 | Bandyopadhyay et al. ............. 228/219 |
| 5,111,991 | 5/1992 | Clawson et al. ...................... 228/180.1 |
| 5,193,735 | 3/1993 | Knight ..................................... 228/42 |
| 5,223,741 | 6/1993 | Bechtel et al. .......................... 257/678 |
| 5,232,145 | 8/1993 | Alley et al. ............................. 228/102 |
| 5,242,096 | 9/1993 | Tsunabuchi et al. ....................... 228/9 |
| 5,345,061 | 9/1994 | Chanasyk et al. ....................... 219/388 |
| 5,364,007 | 11/1994 | Jacobs et al. ............................ 228/42 |
| 5,405,074 | 4/1995 | Den Dopper et al. ..................... 228/42 |
| 5,433,368 | 7/1995 | Spigarelli .................................. 228/8 |
| 5,515,605 | 5/1996 | Hartmann et al. ........................ 29/840 |
| 5,524,810 | 6/1996 | Wathne .................................... 228/42 |
| 5,573,174 | 11/1996 | Pekol .................................... 228/219 |
| 5,611,476 | 3/1997 | Soderlund et al. ....................... 228/42 |
| 5,893,709 | 4/1999 | Leicht .................................... 432/152 |

Primary Examiner—Patrick Ryan
Assistant Examiner—Zidia T. Pittman
Attorney, Agent, or Firm—Orrick, Herrington & Sutcliffe LLP

[57] ABSTRACT

The invention relates to an oven for reflow soldering objects such as printed circuit boards. A temperature differential is established between the top and bottom surfaces of the board to allow gases liberated from solder paste within through-holes to escape, thereby preventing the formation of voids. The oven provides a flow of gas at a first temperature from an upper gas supplying means to the top side of the board. A flow of gas at a second temperature is directed at the bottom side of the board by a lower gas supplying means. According to one aspect of the invention, a portion of the gas supplied by the upper gas supplying means is captured by the lower gas supply means and is heated or cooled to the second temperature. According to another aspect of the invention, a number of pairs of independantly controllable upper and lower gas supplying means are arranged along a conveyor to provide a temperature profile to perform reflow soldering.

5 Claims, 3 Drawing Sheets

REFLOW OVEN

FIELD OF THE INVENTION

The invention generally relates to an oven for heating objects to a predetermined temperature. In particular, the invention relates to a reflow oven for heating printed circuit boards to predetermined temperatures to controllably melt solder paste deposited thereon and a method for reflow soldering a printed circuit board.

BACKGROUND OF THE INVENTION

In a first kind of prior art reflow oven heat is applied to one side of the board.

In a second kind of prior art reflow oven heat is supplied to both sides of the board. In this type of oven the temperature applied to each side of the board is substantially equal.

When reflow-soldering printed circuit boards containing components like connectors or sockets, which have pins, the pins extend through holes in the circuit board. Solder paste applied to one side of the board prior to the insertion of such components is usually dragged along with the pins during the insertion process and ends up on both sides of the board.

During the reflow process, the solder paste is melted, and the molten solder flows over the pins and circuit board. When the board is cooled and the solder solidifies the connection is made. However, during the reflow process gases are liberated from the melting reflow solder. Bubbles of such gases may lead to voids, especially within the holes of the circuit board and adjacent to the pins of through-hole components. This deteriorates the soldering quality.

OBJECTS AND SUMMARY OF THE INVENTION

In view of the problem of the formation of voids within solder joints during reflow soldering of circuit boards with through-hole components, it is an object of the invention to provide an oven that allows gases liberated within through-holes during the reflow process to escape, thereby preventing the formation of voids.

A reflow oven according to the present invention allows liberated gases to escape by providing flows of gas in separate temperature zones above and below the circuit board. Separately controlled heating of the top and bottom surfaces of a printed circuit board allow such an oven to melt the solder paste around the pins and in the holes on the lower side of the circuit board before the solder paste on the upper side of the circuit board is melted. Gases liberated from the melting solder on the lower side of the circuit board can escape through the upper un-melted side.

According to an aspect of the invention a reflow oven comprises a conveyor for transporting objects, such as printed circuit boards to be soldered, along a predetermined path, upper gas supply means for supplying gas with a first controlled temperature to the upper side of the object and lower gas supply means for supplying gas with a second controlled temperature to the lower side of the object.

According to a further aspect of the invention, the conveyor extends through a number of separate cells. The temperatures within each cell are independently controllable. This allows the temperature profile of the oven to be adjusted. Also, the cells can provide cooling, as well as heating. Each cell has paired upper gas supply means and lower gas supply means respectively located above and below the conveyor. The temperatures of the upper surface and lower surface of an object to be processed, for example a printed circuit board, are controlled by flows of gas from the upper gas supply means and lower gas supply means, respectively. The gas supplied by the upper and lower gas supply means can be normal air. However, for applications where oxygen would be detrimental, a relatively inert gas such as nitrogen can be used.

According to another aspect of the invention the lower gas supply means receives gas from the upper gas supply means, and adds or removes heat from that gas before applying it to the lower surface of the object being processed. By using gas that has already been heated by the upper gas supply means, and only supplying the energy neccesary to maintain the desired gradient between the top and bottom sides of the object, less energy is required than if the lower gas supply means heated a separate stream of gas. Further, the gradient between the surfaces of objects such as printed circuit boards must be kept small to prevent warping. By supplying only enough energy to create the gradient there is little chance that an oven according to the invention will result in warping. Further, an oven according to this aspect of the invention can more accurately control a temperature difference between upper and lower gas supply means than if each gas supply means controlled gas temperature independent of the other.

According to another aspect of the invention, a method for reflow soldering a printed circuit board consists of moving the board between an upper gas supplying means and a lower gas supplying means, providing gas at a first temperature from the upper gas supplying means to the top surface of the board and providing a gas at a second temperature to the lower surface of the circuit board. According to a further aspect of the invention, the lower gas supplying means captures a portion of the gas at the first temperature, changes the temperature of the gas to the second temperature and supplies the gas to the lower surface of the circuit board.

BRIEF DESCRIPTION OF THE DRAWINGS

Further features and advantages of the invention will be apparent upon consideration of the following detailed description of the present invention taken in conjunction with the following drawings, in which like reference characters refer to like parts, and in which.

DETAILED DESCRIPTION

Figure 2:
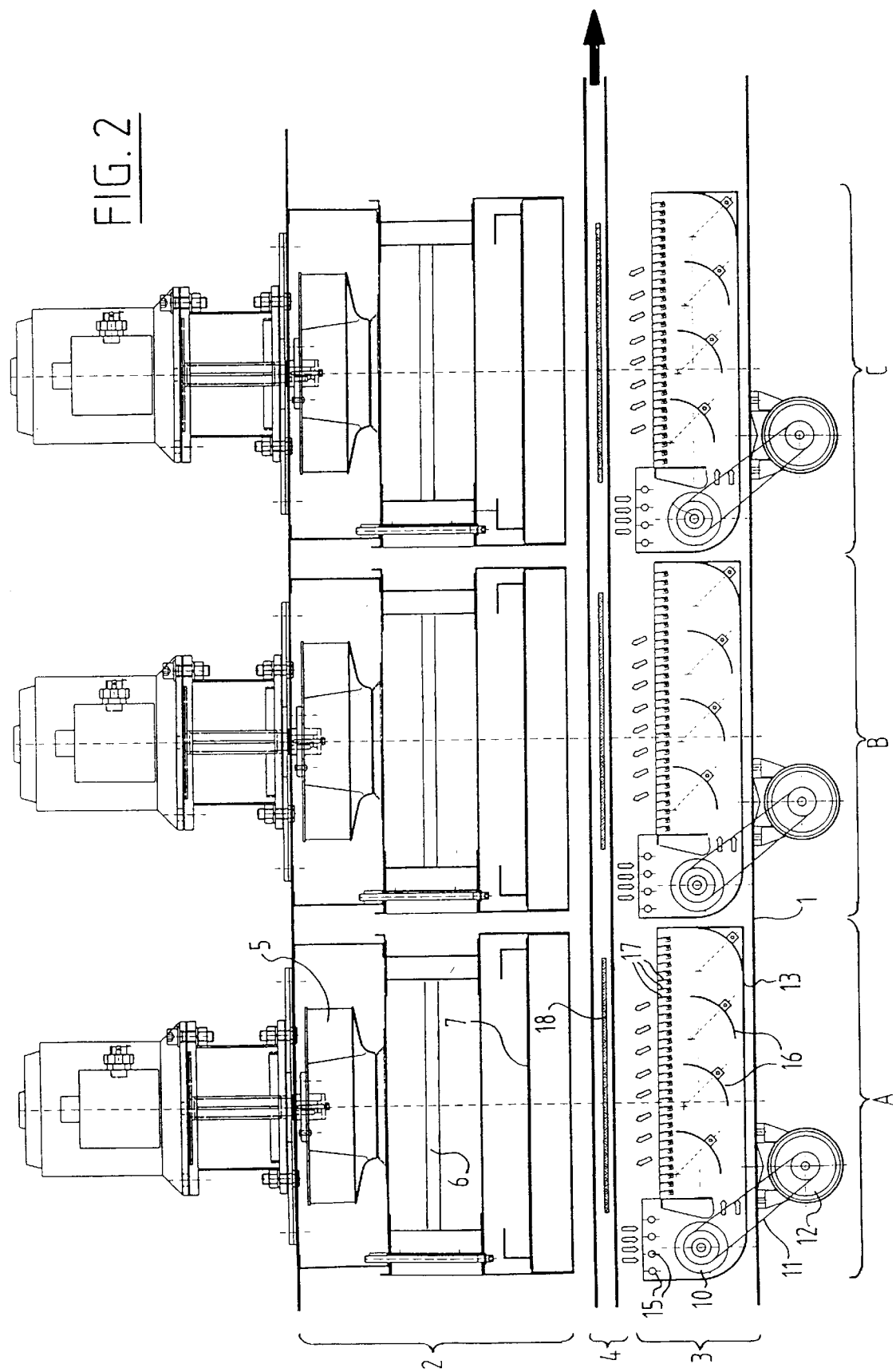
FIG. 2 shows a longitudinal cross-sectional view of a reflow oven according to the embodiment of the invention.

In FIG. 2 a longitudinal cross-section of a part of a reflow soldering apparatus has been depicted. The reflow soldering apparatus 30 comprises in the present case three cells, that is A, B and C. All cells are of substantially identical construction. The reflow soldering apparatus 30 comprises a housing 1, in which each of the three cells A,B, and C are located. The present embodiment includes three cells, however it is understood that a greater or smaller number of cells can be used and remain within the scope of the invention.

Figure 1:
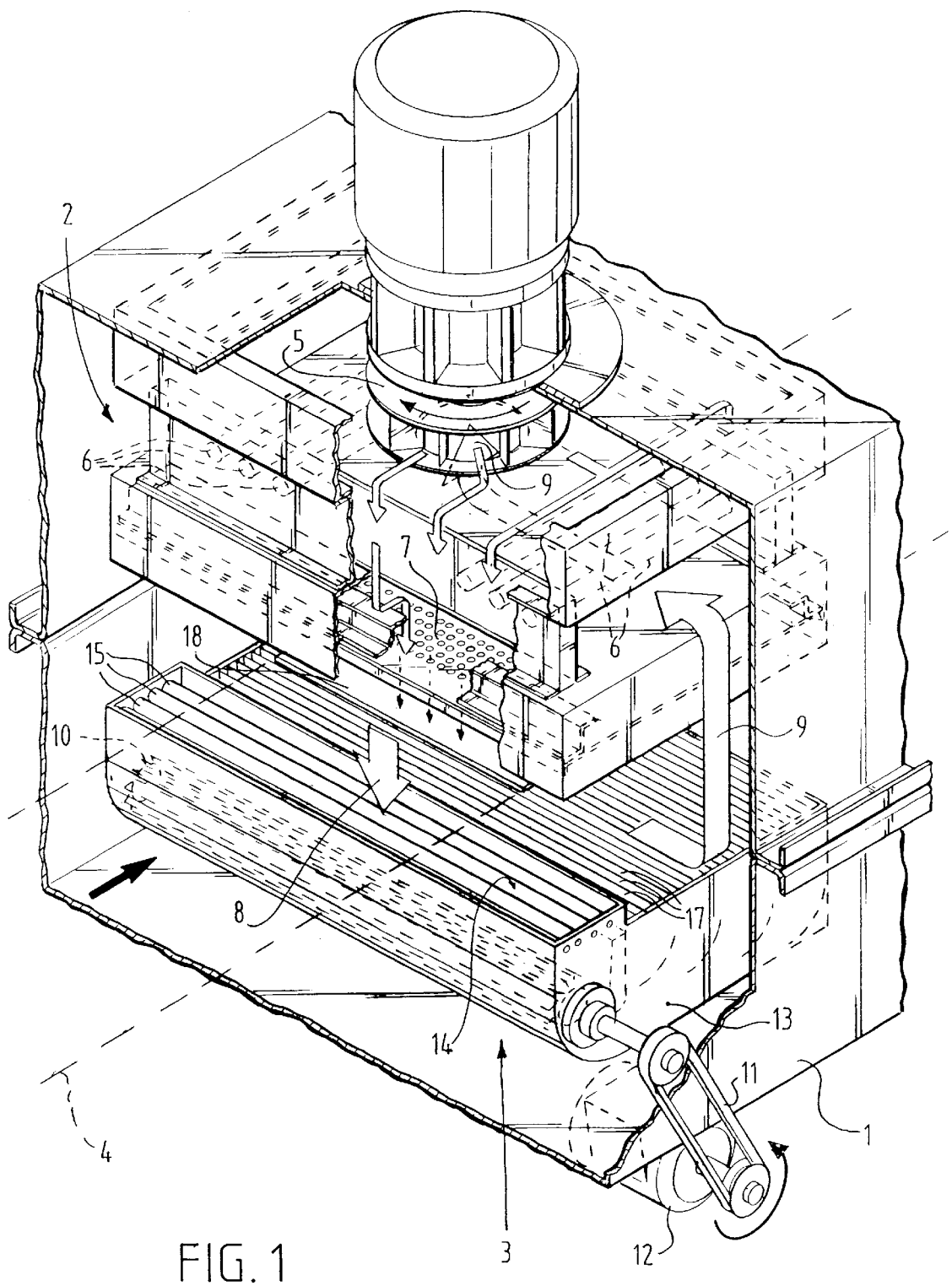
FIG. 1 shows a partially broken perspective view of a heating unit of a reflow oven according to an embodiment of the present invention.

Each cell comprises upper gas supply means 2 and lower gas supply means 3. A conveyor 4 extends between the upper gas supply means 2 and the lower gas supply means 3. FIG. 1 shows another view of one of the three cells shown in FIG. 2.

Each of the upper gas supply means 2 comprises a fan 5, heating elements 6 and a perforated plate 7, through which a heated gas is supplied to the conveyor 4, as has been depicted by arrow 8 in FIG. 1. According to another embodiment of the invention, a cooling apparatus is substituted for the heating elements 6 to provide a cooling zone in the oven 30.

As the arrows in FIG. 1 show, gas that has been driven by the fan 5 through the heating element 6 to the conveyor 4 is circulated back to the fan 5. The recirculating fan 5, heating element 6 and perforated plate 7 shown in FIGS. 1 and 2 have been described in Dutch patent application number 9202279. An essential feature of this arrangement is that the gas stream is confined within each cell. This means that there is very little leakage of the gas in the longitudinal direction of the apparatus.

According to one embodiment of the invention, normal air is the gas that is provided by the upper gas supply means 2. It is to be understood, however, that the invention is not limited to the use of air as a gas and it is possible to use numerous other gases. In the reflow soldering process often it is neccesary to use an inert atmosphere. In such cases nitrogen or other relatively inert gas is used instead of normal air.

Figure 4:
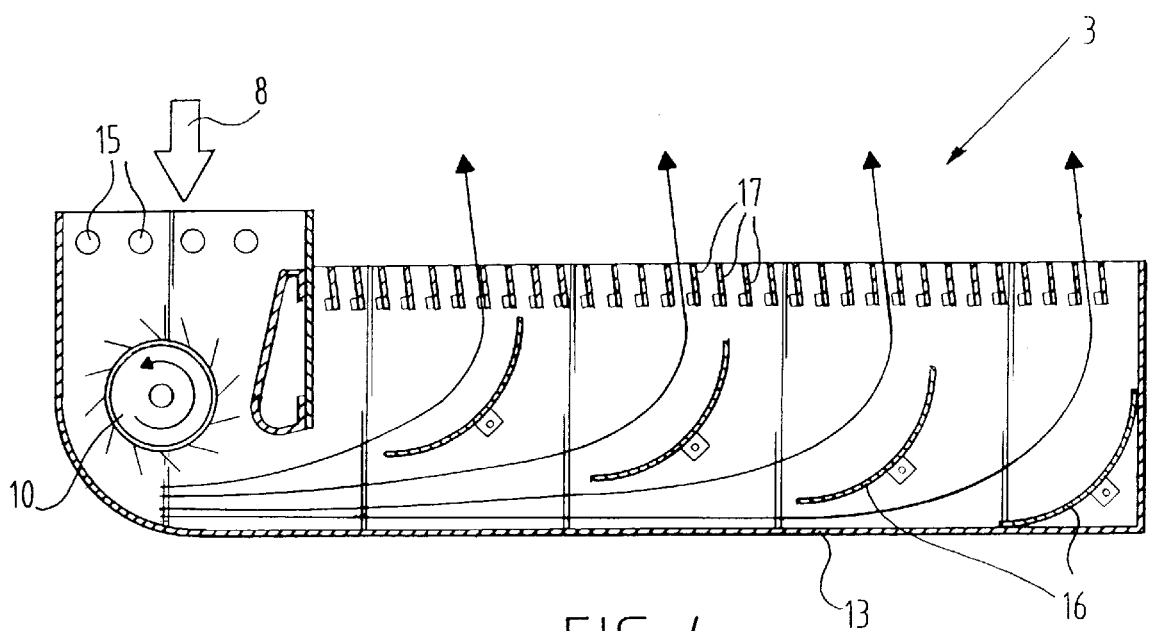
FIG. 4 shows a cross sectional view of a lower gas supply means of the embodiment of the invention.

The lower gas supply means 3, as shown in FIGS. 1, 2, and 4 comprises a lower fan 10, which is driven by means of a driving belt 11 and an electric motor 12, and a gas guiding chamber 13. The gas guiding chamber 13 comprises an input aperture 14, in which heating elements 15 have been located. Further, gas guiding plates 16 have been provided within the gas guiding chamber 13 to direct the flow of gas upward. In addition, louvres 17 are provided on the top of the gas guiding chamber 13 to further direct the flow of gas.

Figure 3:
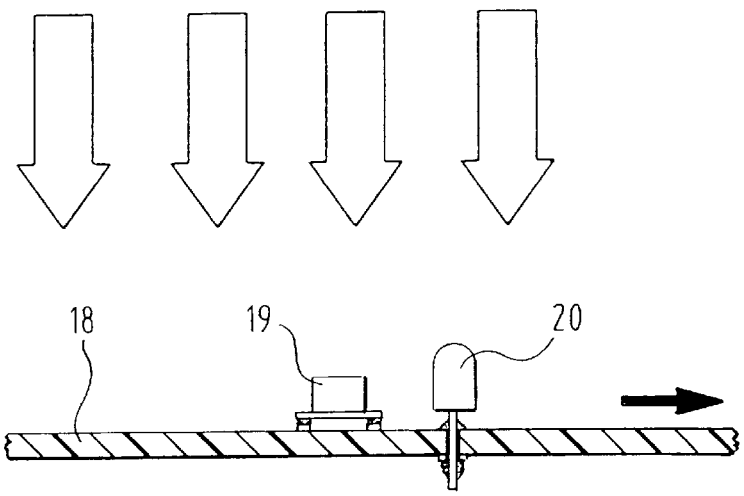
FIG. 3 shows a cross sectional view of a printed circuit board being processed by the embodiment of the invention.
Figure 3:
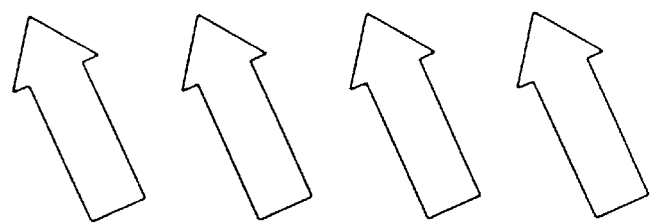

Herein the lower gas supply means 3 works as follows: By means of the lower fan 10 gas is sucked into the gas guide housing 13 through the gas supply aperture 14. During this process this gas is heated by means of heating elements 15. The gas in the gas guiding chamber 13 is subsequently deflected by the gas guiding plates 16, and emerges through the louvres 17. The gas then impinges the lower side of an object within the conveyor 4. FIG. 3 shows a printed circuit board 18 being impinged by gas flows depicted by arrows from the upper gas supplying means 2 and lower gas supplying means 3.

Herein it is possible to control the temperature of the gas by means of the heating elements 15. It is pointed out that this temperature control is limited to prevent excessive differences between the upper and lower surfaces of the object such as the printed circuit board 18. The heat supplied by the heating elements 15 creates a small temperature gradient. It is to be understood that the temperature gradient can also be created by cooling elements substituted for the heating elements 15 so that the temperature of the gas supplied to lower side of the object is cooler than the gas supplied to the upper side.

Further, the apparatus 30 has the advantage that the temperature of the cells A, B, and C can be controlled completely independently. This allows to use a temperature profile adapted to the soldering process.

Further, the application of louvres 17 allows the direction of the gas stream impinging on the lower side of the object to be directed, as has been depicted by the arrows in FIG. 3. FIG. 3 shows a printed circuit board 18 with both surface mounted devices 19 and through-hole devices 20 being reflow soldered. As described above, the temperature gradient between the top surface and the bottom surface of the circuit board 18 allows soldering of through hole devices 20 without the formation of voids around the leads and within the through-holes. According to one embodiment of the invention, a higher temperature is initially applied to the lower side of the circuit board 18, so that the solder on the lower side of the leads of the through-hole components 20 melts, and subsequently a higher temperature is applied to the upper side so that possible gas bubbles in the solder can escape.

FIG. 4 shows the construction of the gas guide housing 13. By pointing the louvres 17 the direction of the emerging gases is changed. In addition, the gas guide plates 16 can be adapted to change the distribution of the gas flow in the longitudinal direction. In the direction of the width of the apparatus use can be made of plates (not shown), covering a part of the louvres 17 to limit the emerging aperture. According to one embodiment of the invention, the apperture is limited so that the width of the exposed louvers 17 corresponds to the width of the objects to be soldered. According to another embodiment of the invention, a digital computer controls the direction of the louvers 17 so that, as the object is transported through the oven 30, the flow of gas directed by the louvers 17 changes. It will, of course be understood that a digital computer can also be used to control other aspects of the oven 30, for example the temperatures of the upper gas supply means 2 and the heat supplied by the heating elements 15.

The above embodiments are illustrative of the present invention. While these are presently considered the most practical and preferred embodiments, it is to be understood that the invention is not limited by this disclosure. This invention is intended to cover various modifications and equivalent arrangements included within the spirit and scope of the invention, as will be apparent to a person of ordinary skill in the art.

We claim:

1. A method for reflow soldering a printed circuit board, the method comprising:

transporting the printed circuit board between an upper gas supplying means and a lower gas supplying means;

heating a gas in the upper gas supplying means to a first temperature;

directing a first portion of the gas at the first temperature to a first surface of the printed circuit board;

directing a second portion of the gas at the first temperature to the lower gas supplying means;

changing the temperature of the second portion of the gas to a second temperature by the lower gas supplying means; and directing the second portion of the gas at the second temperature to a second surface of the printed circuit board.

2. The method according to claim 1, wherein the step of directing the second portion of the gas to the second surface of the printed circuit board includes varying a direction of flow of the second portion of the gas by louvers.

3. The method according to claim 1, wherein the gas is nitrogen.

4. The method according to claim 1, wherein the step of changing the temperature includes heating the second portion of the gas.

5. The method according to claim 1, wherein the step of changing the temperature includes cooling the second portion of the gas.

* * * * *